Jan. 25, 1966 R. N. MELLOTT 3,231,763

BISTABLE MEMORY ELEMENT

Filed Oct. 7, 1963 2 Sheets-Sheet 1

ROBERT N. MELLOTT
INVENTOR.

Jan. 25, 1966 R. N. MELLOTT 3,231,763

BISTABLE MEMORY ELEMENT

Filed Oct. 7, 1963 2 Sheets-Sheet 2

ROBERT N. MELLOTT
INVENTOR.

3,231,763

BISTABLE MEMORY ELEMENT

Robert N. Mellott, Los Angeles, Calif., assignor, by mesne assignments, to The Bunker-Ramo Corporation, Stamford, Conn., a corporation of Delaware

Filed Oct. 7, 1963, Ser. No. 314,127

13 Claims. (Cl. 307—88.5)

Figure 1:
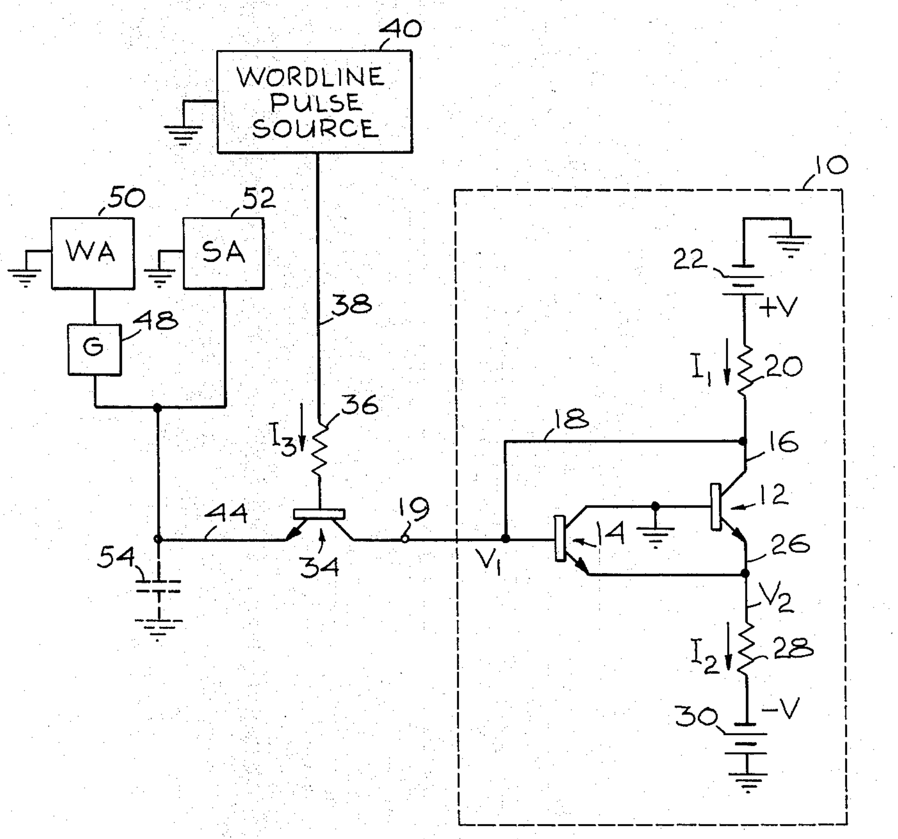

This invention relates to binary memory elements and particularly to a simplified and improved flip-flop circuit in which information may be entered into or extracted therefrom at a single point of the circuit.

Semiconductor flip-flop circuits which have a relatively high speed of operation are desirable for memories in computer systems that require a minimum of delay for the memory reading and writing operations. Flip-flop circuits having a minimum number of circuit elements such as the direct-coupled transistor logic flip-flops or saturation flip-flops conventionally require a pair of transistors with grounded emitters, a resistor coupled between the collector of each transistor and a power source, and a suitable cross-coupling between the collectors and bases of the different transistors. These flip-flops function by utilizing the principle that each transistor when conducting in the saturation region has a collector-to-emitter voltage drop less than the base-to-emitter voltage difference required for forward-biasing of the other transistor into conduction. The saturation flip-flop for satisfactory operation requires that two separate points, such as both collectors, be utilized for triggering the circuit. If this type of flip-flop is triggered to both states from a single point such as from the collector of one transistor, the triggering source must handle a relatively large current for triggering to one of the two states. For example, when NPN type transistors are utilized and the single trigger point is at the collector of the first transistor and the second transistor is conducting, a relatively small current flows to the trigger source when triggering the first transistor into conduction. However, when the first transistor is conducting, a relatively large current, which may be sufficient to destroy the first transistor, must be supplied thereto in order to trigger the second transistor into conduction.

Types of bistable elements that allow entering and extracting of information at a single point and that require a minimum of circuit elements are flip-flop circuits utilizing tunnel diodes as are well known in the art. However, tunnel diodes have the disadvantages that the size of the capsule is relatively large for use in circuit modules and the impedance presented to the trigger source is substantially higher when the flip-flop is in one state than it is when the flip-flop is in the other state. Other factors that make tunnel diodes undesirable for memories are the cost of the tunnel diode elements and the possible inconsistency of parameters among a plurality of tunnel diodes.

It is therefore an object of this invention to provide a simplified and reliable flip-flop circuit.

It is a further object of this invention to provide an improved flip-flop circuit that essentially requires only two transistors and two resistors as circuit elements.

It is another object of this invention to provide a bistable flip-flop circuit in which information is reliably entered therein and extracted therefrom at a single point of the circuit.

It is still another object of this invention to provide a flip-flop circuit which may be triggered at a single point of the circuit and utilizes transistor elements so that the circuit may be constructed into relatively compact circuit modules.

The bistable circuit in accordance with the principles of this invention utilizing two amplifying means and two impedance elements allows information to be reliably entered therein at a single point of the circuit in response to triggering signals of selected polarities and of substantially equal magnitudes and allows information to be extracted therefrom at the same single point.

In one form the novel flip-flop circuit of the present invention includes first and second transistors of similar conuctivity types and defines stored states by one transistor being biased into conduction in or near the saturation region and the other transistor being biased out of conduction. The transistors have the operating characteristics that the voltage drop across the collector and emitter of each transistor when conducting in or near saturation is less than the base-to-emitter voltage difference required to produce substantial emitter-collector conduction in the other transistor. A substantially direct connection is provided between the respective base and collector of the first and second transistors which is also connected to a common terminal such as ground which in turn acts as a point of reference potential for first and second sources of potential. A first impedance element is coupled from the first source of potential to the collector and base of the respective first and second transistors to provide a first current path and a second impedance element is coupled from the emitters of the first and second transistors to the second source of potential to provide a second current path. A common input and output terminal or point is coupled to both the collector and to the base of the respective first and second transistors. During steady storage states, the current flowing through the second impedance element includes the current flowing through the first impedance element as well as the base current of the first transistor when that transistor is conducting or the collector-to-emitter current of the second transistor when that transistor is conducting. When the first transistor is conducting, a positive signal applied to the common terminal triggers the second transistor into conduction to bias the first transistor out of conduction and when the second transistor is conducting a negative signal applied to the common terminal triggers the second transistor out of conduction to bias the first transistor into conduction. The collector-to-emitter voltage drop of the conducting transistor applied across the base and emitter of the nonconducting transistor is sufficiently small to maintain that transistor in a nonconducting state in the absence of a triggering signal.

Figure 2:
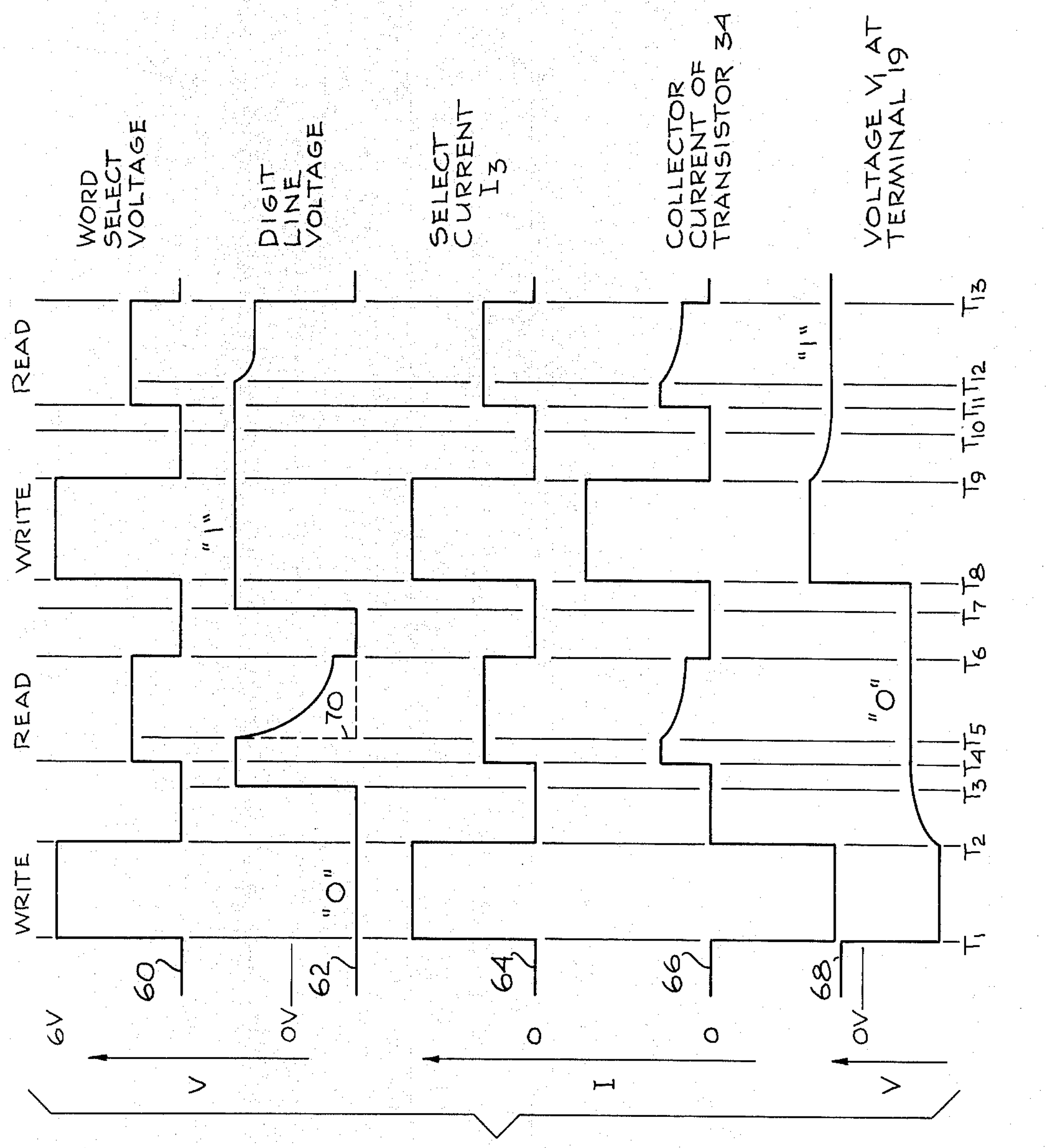

The novel features of this invention, both as to its organization and method of operation, will best be understood from the accompanying description, taken in connection with the accompanying drawings in which:

FIGURE 1 is a schematic circuit and block diagram of the bistable memory element in accordance with the principles of this invention; and FIG. 2 is a diagram of waveforms showing current and voltage as a function of time for explaining the operation of the bistable memory element of FIG. 1.

Referring first to FIG. 1, a bistable memory element or flip-flop 10 includes first and second transistors 12 and 14 both of similar NPN types, for example. The collector of the transistor 12 is coupled to a lead 16 which in turn is coupled through a lead 18 to the base of the transistor 14. The lead 16 is coupled through a first resistor 20 to a suitable source of potential such as a positive terminal of a battery 22 having a negative terminal coupled to ground and developing a voltage +V. The emitters of the transistors 12 and 14 are coupled together at a lead 26 which in turn is coupled through a second resistor 28 to a suitable source of potential such as the negative terminal of a battery 30 having a positive terminal coupled to ground and developing a voltage −V. The base of the transistor 12 and the collector of the transistor 14 are coupled to a suitable source of reference potential such as ground. A requirement for the memory element 10 to be bistable is that the transistors 12 and 14 must have the characteristics that the collector-to-emitter voltage drop during conduction in or near the saturation region of operation of each transistor is less than the base-to-emitter voltage difference or forward-bias required to produce substantial emitter-collector conduction in or "turning on" of the other transistor. The transistors 12 and 14 may each have the properties when operating in or near the saturation region that the collector-to-emitter voltage drop is less than the base-to-emitter voltage drop. Also flip-flop arrangements in accordance with this invention may be realized in which one of the two transistors utilized have a larger collector-to-emitter voltage drop than the base-to-emitter voltage drop thereof when conducting in or near the saturation region. However, as is well known in the art, transistors conventionally have the property of a larger voltage drop between the base and emitter than between the collector and emitter. It is also to be noted that the circuit 10 may operate with either silicon or germanium transistors or with combinations of these types or with equivalent amplifying devices.

For writing information into the memory element 10 and for reading stored information therefrom represented as a voltage $V_1$, a single terminal 19 is provided coupled to the base of the transistor 14 as well as to the lead 18. One gating arrangement which is disclosed in greater detail in U.S. patent application Serial No. 314,205, filed October 7, 1963, by Robert N. Mellott and assigned to the same assignee as the present application, which may be utilized with the memory element in accordance with the principles of this invention includes an NPN type transistor 34 having a collector coupled to the terminal 19 and a base coupled through a resistor 36 to a lead 38 which in turn may be coupled to a suitable source of pulses such as a word line pulse source 40. It is to be noted that the lead 38 may be a word select line controlling not only the flip-flop 10 but also other similar flip-flops associated with a particular word position in a memory array. The emitter of the transistor 34 is coupled to a lead 44 which may represent a digit line in a memory array for both applying informational pulses during a writing operation and for conducting sensed signals during a reading operation. The lead 44 is coupled through a gating circuit 48 to a write amplifier circuit 50 representative of a low impedance source of informational pulses which may also include conventional pulse forming circuits (not shown). The lead 44 is also coupled to a sense amplifier 52 which is required, with the gating arrangement of the transistor 34, to have a relatively high impedance to a suitable potential source or point (not shown) more negative than either the voltage on the lead 38 or the voltage $V_1$ at the terminal 19. A dotted capacitor 54 representative of distributed capacitance is shown coupled between the lead 44 and ground for explaining the operation of the gating transistor 34 when distributed capacitance is present on the digit line.

For purposes of explanation, each of the currents $I_1$ and $I_2$ shown flowing through the respective resistors 20 and 28 may be considered to remain unchanged in value whether transistor 12 or 14 is conducting or whether one or the other is being switched into conduction, although this condition is not a necessity for satisfactory operation. A requirement for operation in accordance with the invention is that the current $I_2$ flowing through the resistor 28 be larger than the current $I_1$ flowing through the resistor 20 by an amount substantially equal to the base current of the transistor 12 when biased in stable conduction and so that the transistor 12 conducts in or near the saturation region. Another requirement for operation of the flip-flop in accordance with this invention is that the current $I_1$ is sufficiently large so that the transistor 14 operates in or near the saturation region when biased in stable conduction. The values of the respective resistors 20 and 28 and the voltages $+V$ and $-V$ are selected to provide the desired currents $I_1$ and $I_2$ in conjunction with appropriate consideration of the amplification characteristics of the transistors 12 and 14.

When the transistor 14 is conducting in a steady state, a voltage $V_2$ on the lead 26 is established by the collector-to-emitter voltage drop of the transistor 14 and may, for example, be $-0.1$ volt. The voltage $V_1$ in this state is established by the algebraic sum of the base-to-emitter voltage drop plus the collector-to-emitter voltage drop of the transistor 14 and may, for example, be $+0.6$ volt assuming a typical base-to-emitter volage drop of 0.7 volt. Thus, the potential between the base and emitter of the transistor 12 established by the collector-to-emitter voltage drop of the transistor 14 is 0.1 volt and the transistor 12 is maintained in a stable nonconductive state. The magnitude of the voltage thus applied across the base and emitter of the transistor 12 is less than a critical value called the threshold voltage so that a substantial forward-bias current is not established.

When the transistor 12 is conducting in a steady state, the voltage $V_2$ on the lead 26 is established by the base-to-emitter voltage drop of the transistor 12 and may, for example, be $-0.7$ volt. The voltage $V_1$, such as on the lead 18, is established by the algebraic sum of the base-to-emitter voltage drop plus the collector-to-emitter voltage drop of the transistor 12 and may be $-0.6$ volt, for example. Thus, the potential difference applied between the base and emitter of the transistor 14 may be 0.1 volt and that transistor is maintained in a stable nonconductive condition, while the transistor 12 is conducting. The magnitude of the voltage thus applied across the base and emitter of the transistor 14 is less than a critical value called the threshold voltage so that a substantial forward-bias current is not established. It is to be noted that during stable operation of the flip-flop 10 the impedance of the path from the lead 16 through the collector and emitter of the transistor 12 when conducting and through the resistor 28 to the negative voltage source 30 is substantially the same as the impedance of the path from the lead 16 through the base and emitter of the transistor 14 when conducting and through the resistor 28 to the voltage source 30.

In the two stable states of the flip-flop 10, the conducting transistor 12 or 14 is substantially in or near the saturation region of operation and the nonconducting transistor is in the cutoff region of operation. For changing the states of the transistors 12 and 14, potentials are applied to the terminal 19 so that selected currents either flow into or from the terminal 19. When the transistor 14 is conducting in a stable state, base current which is the current $I_1$, is supplied from the battery 22 through the resistor 20 and the lead 18 to the base of the transistor 14 and in turn through the resistor 28 to the negative terminal of the battery 30. The current $I_2$ also includes the collector current of the conducting transistor 14. By applying a negative trigger voltage to the terminal 19, current flows thereto from the lead 18 rather than to the base of the transistor 14 so that conduction is instantaneously cut off through that transistor. Consequently the voltage on the lead 26 rapidly falls to a level to bias the transistor 12 into conduction. It is to be noted that during the presence of the negative trigger voltage, substantially all of the current $I_1$ may flow to the terminal 19 and the transistor 12 conducts the current $I_2$ between the base and emitter thereof. In the absence of collector current, the transistor 12 conducting base-to-emitter current in the saturation region, may have essentially the same voltages on the emitter and the collector or a very small voltage difference therebetween. With the relatively small collector-to-emitter voltage drop of the transistor 12 thus established between the base and emitter of the transistor 14, a stable state with the transistor 14 biased out of conduction and the transistor 12 conducting is maintained.

When the transistor 12 is conducting in a stable state, the current $I_1$ flows through the collector-to-emitter path of the transistor 12 and the combination of the current $I_1$ and base current of that transistor flows through the resistor 28 to the −V voltage of the battery 30. Applying a positive trigger voltage to the terminal 19 results in the transistor 14 being biased into conduction and a voltage below ground equal to the relatively small collector-to-emitter voltage drop of the transistor 14 being applied to the lead 26. Accordingly, the transistor 12 is rapidly biased out of conduction and during the occurrence of the positive trigger voltage, current from the terminal 19 and the current $I_1$ flows through the transistor 14. With the relatively small voltage difference developed between the collector and emitter of the transistor 14 established across the base and emitter of the transistor 12 the transistor 12 is maintained in a stable nonconductive state. If the current $I_1$ and the current flowing from the terminal 19 during the triggering operation is greater than the current $I_2$ so that current flows from the base to both the emitter and collector of the transistor 14 the voltage at the emitter thereof may be essentially the same as on the collector or at a slightly lower level.

It is to be noted that when the transistor 14 is conducting, application of a positive trigger voltage to the terminal 19 does not change the established binary state of the flip-flop 10 and when the transistor 12 is conducting application of a negative trigger voltage to the terminal 19 does not change the established binary state of the flip-flop. Thus, when it is desired to write a binary number corresponding to the existing binary state of the flip-flop 10, the conducting and nonconducting states of the transistors 14 and 12 are unaffected. Therefore, the voltages $V_1$ of −0.6 and +0.6 volt, for example, respectively resulting from the transistors 12 or 14 being in a stable conductive state, are applied to the terminal 19 and may be sensed as representations of the stored binary states.

For further explaining the bistable flip-flop circuit in accordance with the principles of this invention, reference is also made to the waveforms of FIG. 2. The operation of the combined flip-flop 10 and gating transistor 34 will be explained although it is to be understood that other types of gating arrangements may be utilized for controlling the flip-flop operation in accordance with the invention. Previous to a time $T_1$, it will be assumed for purpose of illustration, that the transistor 14 is conducting so that the flip-flop 10 is storing a first stable state which may be a binary "1" and that it is desired to write a binary "0" therein represented by the transistor 12 being in the conducting state. As discussed above, with the transistor 14 conducting, the potential $V_1$ at the terminal 12 may be approximately +0.6 volt, for example. In response to the positive pulse of the waveform 60 at time $T_1$, a current $I_3$ shown by a waveform 64 flows through the resistor 36 and through the base-to-emitter path of the gating transistor 34 because of the low level voltage of a waveform 62 applied to the digit line 44. It is to be noted that during a write mode of operation, the impedance of the digit line 44 is relatively low as determined by the write amplifier 50, the gate 48 being closed, and, depending on the state to which the flip-flop is being triggered, as determined by the digit line voltage of the waveform 62, current may either flow into the flip-flop circuit 10 or flow therefrom. The currents which selectively flow into the terminal 19 or flow therefrom during a write operation may be substantially equal in amplitude in accordance with the principles of the invention although the invention is not to be limited to this condition. The gate 48 may be closed during the write mode of operation by a suitable timing pulse (not shown).

For writing a "0," that is, to trigger the transistor 12 into conduction, the negative voltage of the waveform 62 is applied from ihe write amplifier 50 to the digit line 44 so that the current $I_3$ flows from the base to the emitter of the gating transistor 34 through the digit line 44 and into the write amplifier 50, for example. The voltage level of the waveform 62 on the digit line 44 representing the "0" to be written into the flip-flop 10, is lower than that of the voltage $V_1$, so that the current $I_1$ flows between the collector and emitter of the transistor 34 to combine with the current $I_3$ on the digit line 44. As a result of the current $I_1$ flowing to the negative potential $V_1$ at the terminal 19 and through the transistor 34, rather than to the base of the transistor 14, the transistor 14 is biased out of conduction at time $T_1$ and the voltage decreases at the emitter of the transistor 12 to trigger that transistor into conduction between the base and emitter thereof, the transistor conducting in or near the saturation region. The voltage $V_1$ as shown by the waveform 68 which is the algebraic sum of the voltage drops between the base and emitter and between the collector and emitter of the transistor 12 is thus maintained on the terminal 19 at the low level which may be approximately −0.7 volt. At the time $T_2$, the write select pulse of the waveform 60 is terminated, the selection current $I_3$ of the waveform 64 is terminated and current is prevented from flowing from the terminal 19 as the transistor 34 is biased out of conduction. As a result, the current $I_1$ flows between the collector and emitter of the transistor 12.

If the transistor 34 conducts all of the current $I_1$ during this triggering operation, the voltage on the emitter and collector of the transistor 12 may be substantially equal because of the absence of forward-biased collector-to-emitter current flow and the voltage $V_1$ may be approximately −0.7 volt between times $T_1$ and $T_2$. However, if the transistor 34 conducts collector current less than the current $I_1$, the voltage $V_1$ may be substantially near −0.6 volt between times $T_1$ and $T_2$. It is to be noted that the transistor 34 may conduct collector current slightly in excess of the current $I_1$ between times $T_1$ and $T_2$ because the operating characteristics of the transistor 34 may be selected for providing this excess current flow from the terminal 19 to compensate for normal variations of circuit parameters. The result of this design condition is that some current may flow between the base and collector junction of the transistor 12 which in that condition operates as a pair of diodes. During this operation, the voltage $V_1$ of the waveform 68 between times $T_1$ and $T_2$ may also be substantially the voltage at the emitter of the transistor 12 such as −0.7 volt. At time $T_2$ when the base-to-collector current of the transistor 12 is terminated, the collector-to-emitter current thereof increases until a time which may be substantially at time $T_3$ as determined by distributed capacitance within the flip-flop 10 with the 0.1 volt drop thereacross at the time $T_3$ resulting in the voltage $V_1$ of the waveform 68 rising to −0.6 volt, for example. The magnitude of this slight change in voltage level of the waveform 68 after time $T_2$ as a consequence of the transistor 38 having operating characteristics to remove all of the current $I_1$ or slightly more than the current $I_1$ from the flip-flop 10, varies with changes of circuit parameters such as fluctuations of the power supply voltages but is not sufficient to affect the reliable operation of the flip-flop 10.

At the time $T_3$, a positive voltage of the waveform 62 is applied to the digit line 44. Because of distributed capacitance indicated by the dotted capacitor 54 which may be provided by unselected memory cells in a memory array or by the conductor configuration, for example, excessive charging current may flow from the terminal 19 and to the digit line 44 at the beginning of the read mode at a time $T_4$. This excessive flow of current may disturb the stored binary state by triggering the transistor 12 into conduction if the transistor 14 is conducting. By applying the positive voltage of the waveform 62 from a pulse source (not shown) associated with the sense amplifier 52, for example, to the digit line 44, the voltage on the digit line 44 is rapidly increased to a value more positive than the voltage $V_1$ by charging the distributed capacitance of the capacitor 54. At a time $T_5$, this positive voltage of the waveform 62 is removed as indicated by a dotted trailing edge 70. However, this sequence of signals initially directs all of the current $I_3$ into the terminal 19 when the read select pulse of the waveform 60 is applied to the base of the gating transistor 34 such as at the time $T_4$. Thus, in order to prevent undesired writing into the flip-flop 10 during reading, that is, to prevent the transistor 14 from being biased into conduction when the binary state is stored with the transistor 12 conducting, the current $I_3$ of the waveform 64 may be reduced during the reading operation from that provided during the writing operation.

At time $T_4$, which may be the start of the read mode of operation, the flip-flop 10 is storing the binary "0" written therein between times $T_1$ and $T_2$. The word select voltage of the waveform 60 is applied to the base of the transistor 34 and may be at a lower level than that during the write portion of a cycle so as to reduce the current $I_3$ as discussed above. Thus, between times $T_4$ and $T_5$ and at time $T_5$ when the potential of the waveform 62 is removed, the entire current $I_3$ flows into the terminal 19 until the distributed capacitance of the capacitor 54 discharges. Thus between times $T_4$ and $T_5$, the transistor 34 effectively operates as a single forward-biased base-to-collector junction diode.

To satisfactorily sense the state of the flip-flop circuit 10 during a reading operation, portions of the base current $I_3$ must flow to both the emitter and collector of the gating transistor 34, so as to provide substantially the same voltage levels at the emitter and collector thereof. When the distributed capacitance indicated by the capacitor 54 discharges after the time $T_5$, as shown by the voltage of the waveform 62, an increased portion of the current $I_3$ flows into the digit line 44 between times $T_5$ and $T_6$ as indicated by the decrease of base-to-collector current of the waveform 66. Thus, between times $T_5$ and $T_6$, the current $I_3$ divides as the base-to-emitter diode of the transistor 34 becomes increasingly more forward-biased so that portions flow to both the emitter and the collector with the gating transistor 34 operating as a pair of forward-biased diodes.

At a suitable previous time such as time $T_3$ when the voltage of the waveform 62 is applied to the digit line 44, the gate 48 is opened so that the relatively high impedance of the sense amplifier 52 is effectively connected to the digit line 44. This impedance provided by the sense amplifier 52 is selected so that shortly before time $T_6$ after the distributed capacitance of the capacitor 54 is substantially discharged, only a part, which may be approximately one-half of the current $I_3$, flows into the digit line 44. A substantially equal voltage drop from the base to the emitter and from the base to the collector of the transistor 34 is accordingly developed. Thus, the transistor 34 effectively provides a short circuit between the collector and the emitter thereof and the voltage $V_1$ may be sensed on the digit line 44 as the voltage of the waveform 62 at substantially the same level as the voltage of the waveform 68 at the terminal 19. Between times $T_5$ and $T_6$, substantially close to time $T_6$, the sense amplifier 52 may be controlled or strobed to sense the voltage of the waveform 62 on the digit line 44.

During the next write portion of the cycle which may be considered to start at time $T_8$, a binary "1" may be written into the flip-flop 10 by previously applying a positive voltage of the waveform 62 to the digit line 44 at a suitable time such as time $T_7$. At time $T_8$ the write select pulse of the waveform 60 is applied to the word line 38 to bias the transistor 34 into conduction and apply the voltage $V_1$ of the waveform 68 to the terminal 19. In the example, the transistor 12 is conducting, representative of the stored "0" state. The current $I_3$ of the waveform 64 flows to the collector of the transistor 34 and to the terminal 19 because the positive voltage of the waveform 62 prevents the current $I_3$ from flowing to the emitter thereof. During this writing condition, the gating transistor 34 operates as a single forward-biased diode. Thus, at time $T_8$ the voltage $V_1$ biases the transistor 14 into conduction and the voltage $V_2$ rises toward ground as determined by the voltage drop between the collector and emitter of the transistor 14 to bias the transistor 12 out of conduction representative of a binary "1" state. Also, at time $T_8$ depending upon time constants in the flip-flop 10, the current $I_3$ flowing from the terminal 19 may instantaneously flow through the transistor 12 to cause that transistor to go out of the saturation region and into the active region as a result of an effective shift of the load line, and to increase the voltage drop between the collector and emitter thereof.

Because the sum of the current $I_1$ and the current $I_3$ flowing into the terminal 19 from the transistor 34 may be selected to be slightly in excess of the current $I_2$, the combined current between times $T_8$ and $T_9$ may be slightly greater than will flow through the base-to-emitter path of the transistor 14. Thus, under these conditions, a portion of the combined current $I_3$ and $I_1$ will flow through the base-to-collector path of the transistor 14 which then operates as a pair of diodes. In this condition the potential on the emitter of the transistor 14 is substantially the same as on the collector or at ground level and the voltage $V_1$ of the waveform 68 may be maintained at approximately +0.7 volt between times $T_8$ and $T_9$ using the representative values previously discussed. At the completion of the write portion of the cycle when the current $I_3$ is terminated at time $T_9$ in response to the write pulse of the waveform 60, current flow builds up in the collector-to-emitter path of the transistor 14, at a rate determined by distributed capacitance within the flip-flop 10, until approximately 0.1 voltage drop, for example, is developed thereacross at a time such as time $T_{10}$. The voltage $V_1$ of the waveform 68 at that time is maintained at +0.6 volt for example. The magnitude of this slight change in voltage level, when the combined current flowing into the base of the transistor 14 is greater than the current $I_2$, varies with changes of circuit parameters such as fluctuations of the power supply voltages but is not sufficient to affect the reliable operation of the flip-flop 10.

In a manner similar to the read operation previously discussed, a positive voltage may be applied to the digit line at time $T_{10}$ from the sense amplifier 52, the gate 48 being opened at that time, to charge the distributed capacitor 54, which voltage may be maintained until time $T_{12}$, for example. At time $T_{11}$ the lower level read pulse of the waveform 60 is applied to the word line 38 and the reading operation is performed similar to that previously discussed, after removal of the positive voltage on the digit line 44 at time $T_{12}$ and before the termination of the read pulse of the waveform 60 at time $T_{13}$. The voltage of the waveform 62 falls in level after time $T_{12}$ as the distributed capacitance of the capacitor 54 discharges and the current $I_3$ of the waveform 64 flows through both the emitter and collector of the transistor 34. Thus, during a period before time $T_{13}$, the voltage $V_1$ of the waveform 68 is effectively applied to the emitter of the transistor 34 at substantially the same level as the voltage of the waveform 62, which voltage may be strobed at the sense amplifier 52.

Although the flip-flop arrangement has been explained utilizing NPN type transistors, it is to be understood that opposite conductivity types may be utilized in accordance with the principles of this invention by appropriate reversal of the polarity relations as is well known in the art.

Although it is to be expressly understood that the values of the various components and voltage levels of the various components and voltage levels of the circuit of the present invention may be varied for any desired purpose, the following specifications for the circuit shown in FIG. 1 are included by way of example.

| | |
|---|---|
| Resistor **36** | 3.3 kilo-ohms. |
| Resistor **20** | 10 kilo-ohms. |
| Resistor **28** | 3.3 kilo-ohms. |
| Transistors **12**, **14** and **34** | 2N744. |
| Word select voltage, waveform **60** for write | +6 volts. |
| Word select voltage, waveform **60** for read | +2 volts. |
| Voltage $V_1$ during read | −0.6 volt or +0.6 volt. |
| Digit line voltage, waveform **62** during write | −0.7 volt or +1 volt. |

The digit line 44 during read is connected through an impedance to a voltage source (included in sense amplifier 52) such that approximately 0.3 milliampere of current flows thereto after being raised to a positive voltage at times $T_3$ and $T_{10}$.

Thus, there has been described an improved bistable memory element that allows information to be entered therein and extracted therefrom at a single terminal with relatively small currents flowing into or from the trigger source when information is entered therein. The simplified flip-flop essentially requires only a pair of transistors and first and second current paths. Because of the reliable operating characteristics, highly stable storage is provided with rapid triggering in response to positive and negative trigger pulses having substantially equal magnitudes. In some arrangements in accordance with this invention, the trigger currents flowing into or out of the source of trigger pulses may be substantially equal.

What is claimed is:

1. A bistable element comprising
first and second substantially constant current paths each having first and second ends,
first and second amplifying means each having a control terminal and first and second load terminals, with the first load terminal of said first amplifying means coupled to the control terminal of said second amplifying means and to the first end of said first current path, and the second load terminals of said first and second amplifying means coupled to the first end of said second current path,
and means coupling the respective control terminal and first load terminal of said first and second amplifying means to the second ends of said first and second current paths.

2. A bistable memory element comprising
a common input and output terminal,
first and second potential means,
first and second amplifying means each having a control terminal and first and second load terminals, the first load terminal and the control terminal of the respective first and second amplifying means coupled to said common terminal and to said first potential means, the second load terminals of said first and second amplifying means coupled to said second potential means,
a source of reference potential coupled between said first and second potential means and the respective control terminal and first load terminal of said first and second amplifying means,
and controllable means coupled to said common terminal for applying pulses of a first or a second voltage level for establishing one or the other amplifying means in conduction and for sensing a voltage representative of either said first or second amplifying means being conductive.

3. A flip-flop comprising
first and second current paths each maintaining substantially constant current flows therethrough,
a first and a second transistor each having an emitter, a collector and a base with the collector of said first transistor coupled to the base of said second transistor and to said first current path, and the emitters of said first and second transistors coupled to said second current path,
and a source of reference potential coupled to the respective base and collector of said first and second transistors.

4. A flip-flop comprising
a common input and output terminal,
first and second current paths, each maintaining substantially constant current flows therethrough and each having first and second ends,
first and second transistors each having an emitter, a collector and a base with the collector of said first transistor coupled to the base of said second transistor, to said common terminal and to the first end of said first current path, and the emitters of said first and second transistors coupled to the first end of said second current path,
and means coupling the respective base and collector of said first and second transistors to the second ends of said first and second current paths.

5. A binary memory element comprising
first and second current paths with said second current path passing a substantially larger current than said first current path,
first and second transistors each having an emitter, a collector and a base with the collector of said first transistor coupled to the base of said second transistor and to said first current path and with the emitters of said first and second transistors coupled to said second current path,
and a source of fixed potential coupled to the base of said first transistor and to the collector of said second transistor.

6. A bistable memory element comprising
first and second transistors each having an emitter, a collector and a base,
first and second sources of potential, each having first and seconds ends,
first impedance means coupled from the first end of said first source of potential to the collector of said first transistor and the base of said second transistor,
second impedance means coupled from the emitters of said first and second transistors to the first end of said second source of potential,
means coupling the base of said first transistor and the collector of said second transistor to the second ends of said first and second sources of potential,
a common input and output terminal coupled to the collector of said first transistor to the base of said second transistor, said first and second transistors providing an impedance from said common terminal through the collector and emitter of said first transistor and through said second impedance means substantially equal to an impedance from said common terminal through the base and emitter of said second transistor and through said second impedance means, and
means coupled to said common terminal for selectively applying signals to bias either said first or said second transistor into conduction and for sensing signals at said common terminal representative of either said first or said second transistor being biased into conduction.

7. A flip-flop comprising
first and second current paths,
a source of reference potential,
first and second transistors each having an emitter, a collector and a base, with the collector of said first transistor coupled to the base of said second transistor and to said first current path, and the emitters of said first and second transistors coupled to said second current path, the respective base and collector of said first and second transistors coupled to said source of reference potential, each of said transistors when conducting being in or near the saturation region with the collector-to-emitter voltage drop of each transistor being less than the base-to-emitter voltage difference required for forward-biasing the other transistor into conduction.

8. A bistable circuit comprising first and second means for developing first and second potentials, first and second transistors each having an emitter, a collector and a base, each of said transistors when conducting having characteristics to provide a smaller voltage drop across the collector and emitter thereof than the voltage difference required across the base and emitter of the other transistor for conduction thereof, a first resistor coupled between one end of said first means and the respective collector and base of said first and second transistors, a second resistor coupled between one end of said second means and the emitters of said first and second transistors, third means coupling the other ends of said first and second means and the respective base and collector of said first and second transistors, and a common input and output terminal coupled to the respective collector and base of said first and second transistors.

9. A flip-flop circuit having first and second states comprising first and second means for developing first and second potentials, and each having first and second ends, first and second transistors each having an emitter, a collector and a base, each of said transistors when conducting having characteristics to provide a smaller voltage drop across the collector and emitter thereof then the voltage difference required across the base and emitter of the other transistor for conduction thereof, a first resistor coupled between the first end of said first means and the respective collector and base of said first and second transistors, a second resistor coupled between the first end of said second means and the emitters of said first and second transistors, third means coupling the respective base and collector of said first and second transistors and the second ends of said first and second means, a common input and output terminal coupled to the respective collector and base of said first and second transistors, and fourth means coupled between said common terminal and said third means for producing a control voltage having either a first or second polarity for controlling the state of the flip-flop circuit.

10. A bistable circuit comprising first and second means for respectively providing first and second potentials, first and second transistors of the same conductivity type and each having an emitter, a collector and a base, the collector and the base of the respective first and second transistors coupled together at a junction and to said first means, the emitters of said first and second transistors coupled to said second means, and first and second transistors when being conducting in or substantially near the saturation region and each having the properties that the voltage drop between the collector and emitter thereof is less than the voltage difference required for forward-biasing the base and emitter of the other transistor into conduction, a source of reference potential coupled to said first and second means, to the base of said first transistor and to the collector of said second transistor, and controllable means coupled to the junction of the collector and base of the respective first and second transistors for selectively applying potentials of selected polarities relative to said reference potential and of substantially equal magnitudes for triggering either said first or said second transistors into conduction, and for selectively sensing potentials applied to said junction by said first or second transistor being biased in conduction.

11. A bistable memory element comprising a common input and output terminal, first and second transistors of the same conductivity type each having an emitter, a collector and a base and each having a saturation region of operation, each of said transistors when conducting in or near said saturation region developing a collector-to-emitter voltage drop of a smaller magnitude than the base-to-emitter voltage difference required to bias the other transistor into conduction, first means for supplying a first current and having a first and a second end with the first end coupled to the collector and base of the respective first and second transistors, said first current being of a magnitude when flowing into the base of said second transistor biased into conduction to maintain said second transistor in or near the saturation region, second means for receiving a second current and having a first and a second end with the first end coupled to the emitters of said first and second transistors, said second current having a magnitude greater than said first current so as to receive base current of said first transistor biased into conduction to maintain said first transistor in or near the saturation region, third means coupling the base and collector of the respective first and second transistors to the second ends of said first and second means, and signal means coupled between said common terminal and said third means for selectively applying either a positive going or negative going signal of substantially equal absolute magnitudes for controlling the state of said bistable memory element so that either said first or said second transistor is biased into conduction.

12. A flip-flop element having storage states defined by a conducting and a nonconducting transistor comprising first and second transistors of similar conductivity types each having an emitter, a collector and a base, and each having a saturation region of conduction, a first and a second potential means, a first resistor coupled between said first potential means and the collector and base of the respective first and second transistors, a second resistor coupled between the emitters of said first and second transistors and said second potential means, said first resistor having a value larger than said second resistor, a source of reference potential coupled to the base and collector of the respective first and second transistors and to said first and second potential means, each of said transistors when conducting in or substantially in said saturation region developing a smaller voltage drop between the collector and emitter thereof than the base-to-emitter voltage difference required to forward-bias the other transistor into conduction, and means coupled to the base and collector of the respective first and second transistors for selectively supplying a first current to the base of said second transistor when said first transistor is conducting to render said second transistor conductive substantially in the saturation region and render said first transistor nonconductive, and for selectively receiving, when said second transistor is conducting, a second current flowing from said first potential means through said first resistor to render said second transistor non-conductive and render said first transistor conductive substantially in the saturation region, said first and second currents having substantially equal magnitudes, said means selectively sensing the potentials at the base and collector of the respective first and second transistors representative of storage states established by the conducting transistor.

13. A flip-flop for being triggered to a first or a second stable state in response to applied first and second voltage pulses of opposite polarities relative to a reference potential and of substantially equal magnitudes applied to a common terminal with substantially equal currents respectively flowing into said terminal and to the flip-flop or from said flip-flop to said terminal comprising first and second means for respectively developing first and second potentials, first and second resistors each having first and second ends with the first end of the respective first and second resistors respectively coupled to said first and second means, first and second transistors each having an emitter, a collector, and a base, each of said transistors when conducting being in or near the saturation region thereof and having characteristics to provide a smaller voltage drop across the collector and emitter thereof than the voltage difference required across the base and emitter to forward-bias the other transistor into conduction, the respective collector and base of said first and second transistors coupled to the second end of said first resistor and to said common terminal, the emitters of said first and second transistors coupled to the second end of said second resistor, and a source of reference potential coupled to said first and second means and to the respective base and collector of said first and second transistors, whereby in response to said first pulse when said first transistor is conducting, said second transistor is biased into conduction with the voltage drop between the collector and emitter thereof maintaining the first transistor nonconductive, and in response to said second pulse when said second transistor is conducting, said second transistor is biased out of conduction and said first transistor into conduction with the voltage drop between the collector and emitter of said first transistor maintaining said second transistor nonconductive, the algebraic sum of the voltage drop between the base and emitter and between the collector and emitter of the conducting transistor relative to the reference potential being applied to said common terminal for representing the first or the second stable states of said flip-flop.

References Cited by the Examiner

UNITED STATES PATENTS

| | | | |
|---|---|---|---|
| 2,986,650 | 5/1961 | Wolfendale | 307—88.5 |
| 2,987,628 | 5/1961 | Abbott et al. | 307—88.5 |

OTHER REFERENCES

IBM Technical Disclosure Bulletin Circuit Breaker by Erdmar vol. 5, No. 11, April 1963, page 51.

ARTHUR GAUSS, *Primary Examiner.*